(12) United States Patent
Chou

(10) Patent No.: US 9,236,206 B1
(45) Date of Patent: Jan. 12, 2016

(54) THIN KEYBOARD COMMAND TRIGGER STRUCTURE

(71) Applicant: ZIPPY TECHNOLOGY CORP., New Taipei (TW)

(72) Inventor: Chin-Wen Chou, New Taipei (TW)

(73) Assignee: Zippy Technology Corp., New Taipei (TW)

( * ) Notice: Subject to any disclaimer, the term of this patent is extended or adjusted under 35 U.S.C. 154(b) by 0 days.

(21) Appl. No.: 14/611,632

(22) Filed: Feb. 2, 2015

(51) Int. Cl.
*H01H 13/7073* (2006.01)
*H01H 13/705* (2006.01)
*G06F 3/02* (2006.01)

(52) U.S. Cl.
CPC ......... *H01H 13/7073* (2013.01); *G06F 3/0202* (2013.01); *H01H 13/705* (2013.01); *H01H 2221/044* (2013.01); *H01H 2221/054* (2013.01); *H01H 2221/09* (2013.01); *H01H 2227/036* (2013.01)

(58) Field of Classification Search
CPC ............. G06F 3/0202; H01H 2221/09; H01H 2221/044; H01H 2207/03; H01H 13/7073; H01H 2221/054; H01H 13/705; H01H 2227/036
See application file for complete search history.

(56) References Cited

U.S. PATENT DOCUMENTS

| 4,315,114 A * | 2/1982 | Monti, Jr. ............. | H01H 13/705 200/343 |
| 8,212,167 B2 * | 7/2012 | Chen ..................... | H01H 13/705 200/344 |
| 2009/0178912 A1 * | 7/2009 | Chen ..................... | H01H 13/7073 200/5 A |
| 2014/0027259 A1 * | 1/2014 | Kawana ................ | H01H 13/705 200/517 |
| 2014/0284193 A1 * | 9/2014 | Chou .................... | H01H 13/705 200/5 A |

FOREIGN PATENT DOCUMENTS

| JP | 2005116326 A | * | 4/2005 |
| TW | 445471 | | 7/2001 |
| TW | I220213 | | 8/2004 |
| TW | M346861 | | 12/2008 |
| TW | M419973 | | 1/2012 |
| TW | M426075 | | 4/2012 |
| TW | M434979 | | 8/2012 |

* cited by examiner

*Primary Examiner* — Daniel J Colilla
(74) *Attorney, Agent, or Firm* — Muncy, Geissler, Olds & Lowe, P.C.

(57) ABSTRACT

A thin keyboard command trigger structure includes a circuit board and a frame. The frame is stacked over the circuit board and formed an outer frame, a plurality of inner frames and a plurality of keycaps in an integrated manner. The outer frame has a plurality of holding zones. Each keycap is held in one of the holding zones. The outer frame and the keycap are bridged by one inner frame. Each inner frame has at least two first connecting portions connected to the outer frame and at least two second connecting portions connected to the keycap. Each first connecting portion and each second connecting portion are bridged by a support portion which has a bend spot and can generate deformation when the keycap is moved to the trigger portion. The support portion at the second connecting portion is at an elevation higher than the first connecting portion.

18 Claims, 8 Drawing Sheets

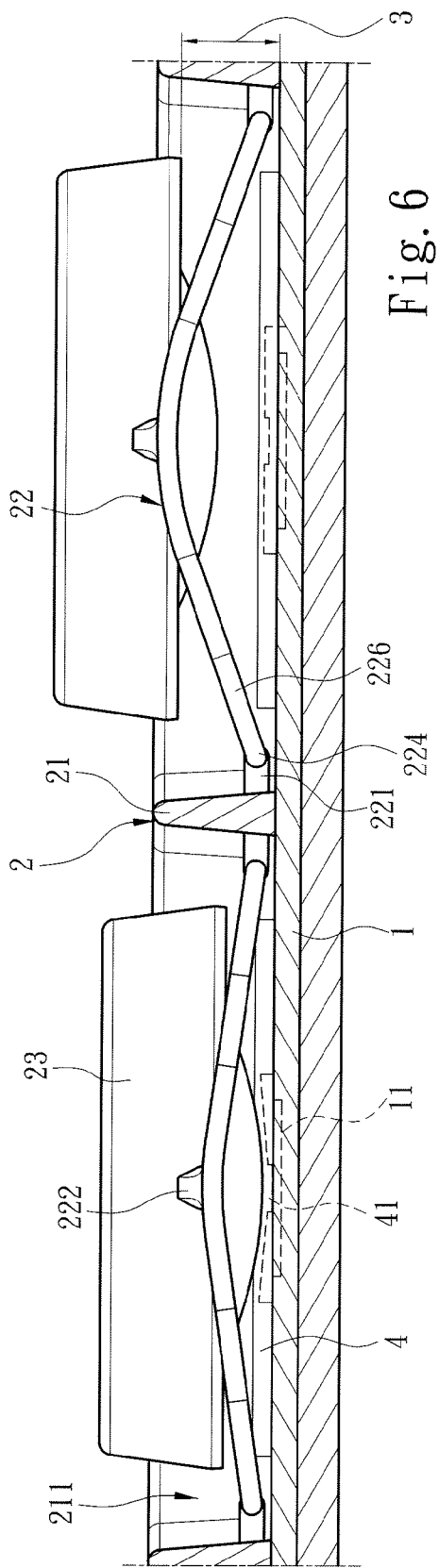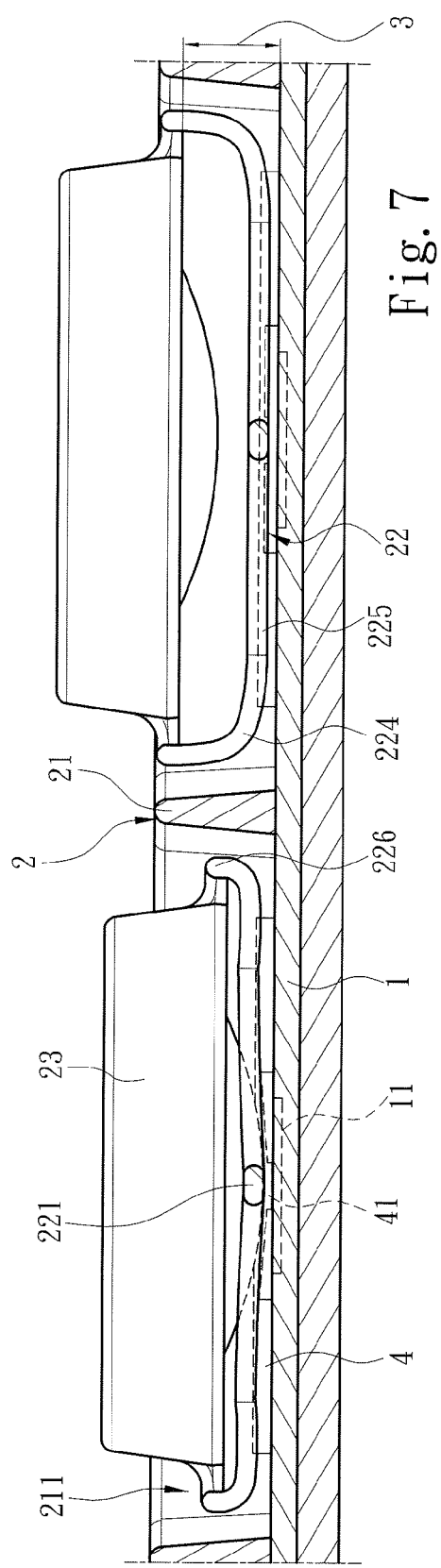

THIN KEYBOARD COMMAND TRIGGER STRUCTURE

FIELD OF THE INVENTION

The present invention relates to a keyboard command trigger structure and particularly to a command trigger structure that employs a frame structure to replace a conventional keycap link movement mechanism to make the keyboard thinner.

BACKGROUND OF THE INVENTION

Conventional keyboards such as those disclosed in Taiwan Patent Nos. 445471, I220213 and M346861 generally include a keycap, a circuit board triggered by the keycap to generate a command signal, a baseboard located at one side of the circuit board and a link movement mechanism with two ends to bridge the keycap and the baseboard. The keycap is depressible to move towards the circuit board. The link movement mechanism is compressed downwards to press and set on a circuit switch on the circuit board to generate a corresponding control signal. If the keycap is not depressed to move towards the circuit board the link movement mechanism provides a return elastic force to push the keycap in normal conditions to move away from the circuit board at a selected elevation. The link movement mechanism requires an assembly space of a definite height that makes the keyboard thicker. In view of the prevailing trend on the requirement of computer design that makes thin and lighter weight of products the main appeal, especially notebook computers, the thickness ratio of keyboard module is the main factor affecting the total thickness of the note computers. Hence all producers have devoted a great deal of efforts trying to make the keyboard structure thinner to reduce the total thickness.

In order to overcome the aforesaid problem, some producers have proposed another keyboard design, such as Taiwan Patent M434979 which provides a V-shaped structure consisting of a first support member and a second support member to solve the thickness problem resulting from the X-shaped structure of the conventional link movement mechanism; or Taiwan Patent M419973 which has an extensible lift structure located between the keycap and the circuit board to replace the conventional link movement mechanism to facilitate miniaturization; or Taiwan Patent M426075 which has a first support member and a second support member around the keycap to replace the conventional link movement mechanism to reduce total thickness of the keyboard. Although the aforesaid techniques can reduce the total thickness of the keyboard, they merely implement the link movement mechanism in other forms, thus the keyboard structure still has a certain thickness. Moreover, the structures they provided are difficult to make and assemble.

SUMMARY OF THE INVENTION

The primary object of the present invention is to overcome the thinning problem occurred to the conventional keyboard structure.

To achieve the foregoing object the present invention provides a thin keyboard command trigger structure that includes a circuit board and a frame. The circuit board has a plurality of trigger portions each can be triggered to generate a keyboard command. The frame is stacked over the circuit board and includes an outer frame, a plurality of inner frames and a plurality of keycaps that are formed in an integrated manner. The outer frame has a plurality of holding zones corresponding to the trigger portions. Each keycap is located in one holding zone corresponding to one trigger portion. The outer frame and the keycap are bridged by one inner frame. Each inner frame has at least two first connecting portions connected to the outer frame and at least two second connecting portions connected to the keycap. Each first connecting portion and each second connecting portion are bridged by a support portion which can generate a deformation elastic force when the keycap is moved to the trigger portion. The support portion has a bend spot. The support portion from the bend spot to the first connecting portion is defined as a first connecting section. The support portion from the bend spot to the second connecting portion is defined as a second connecting section. The second connecting portion held in the holding zone is at an elevation higher than that of the first connecting portion. The bend spot is at an elevation equal to or lower than that of the first connecting portion.

In one embodiment the second connecting portion held in the holding zone is at an elevation equal to or higher than that of the first connecting portion, and the bend spot is at an elevation lower than that of the first connecting portion and the second connecting portion.

In another embodiment the inner frame held in the holding zone has elevation variations in the order of the second connecting portion being equal to or greater than the bend spot which in turn is greater than the first connecting spot.

In yet another embodiment the keycaps are held horizontally or vertically in the holding zones, and the frame has a support rib interposed between two abutting holding zones.

In yet another embodiment each first connecting portion is formed at a width gradually increased from the junction of the first connecting portion and the outer frame toward the support portion, and each second connecting portion is formed at a width gradually shrunk from the junction of the second connecting portion and the support portion toward the junction with the keycap.

In yet another embodiment each keycap and the circuit board are interposed by a movement interval which has an elastic support member located therein to aid movement of the keycap relative to the circuit board.

In yet another embodiment each trigger portion includes a primary trigger switch and a plurality of secondary trigger switches that are electrically connected to each other, and each elastic support member has a plurality of contact portions corresponding respectively to the primary trigger switch and the secondary trigger switches.

In yet another embodiment the second connecting section is a curved surface.

By means of the construction set forth above, compared with the conventional keyboards, the invention provides advantageous features as follow:

1. Total thickness of the keyboard can be reduced to make the keyboard thinner. The invention, through the outer frame and the inner frames formed on the frame to support each keycap, allows the keycap to be held in the holding zone of the frame and moved reciprocally, hence the keycap link movement mechanism used in the conventional keyboard can be dispensed with.

2. Since the conventional keycap link movement mechanism is no longer needed in the invention, total structure of the keyboard is simpler and assembly is easier without the need of complicated alignment and positioning.

3. Through the elevation variations of the support portion different types of tactile depressing feel can be provided.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 6 is a sectional view taken on line A-A in FIG. 5 showing the keycap in a depressed condition.

FIG. 7 is a sectional view taken on line B-B in FIG. 5 showing the keycap in a depressed condition.

DETAILED DESCRIPTION OF THE PREFERRED EMBODIMENTS

Figure 1:
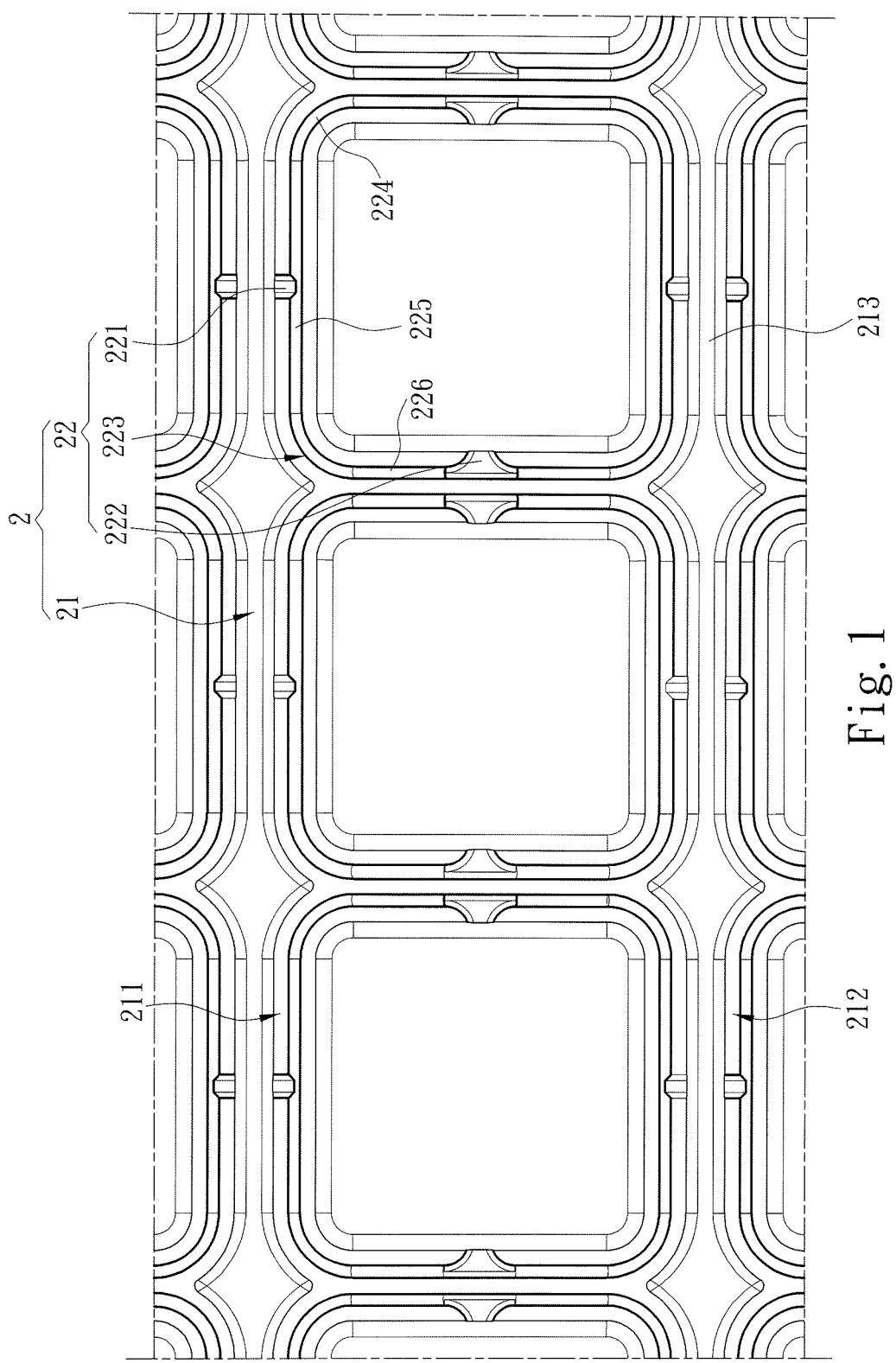
FIG. 1 is a top view of the frame of a first embodiment of the invention.

Please referring to FIGS. 1 through 5, the present invention aims to provide a thin keyboard command trigger structure that is depressible by users to generate a keyboard command. The command trigger structure includes a circuit board 1 and a frame 2. More specifically, the circuit board 1 can be coupled with a keyboard baseboard (not shown in the drawings) and has a plurality of trigger portions 11 each can be triggered to generate the keyboard command. The trigger portions 11 are trigger electrodes configured and laid on the circuit board 1. The frame 2 can be made integrally from plastics through a mechanical fabrication process. The frame 2 is stacked over the circuit board 1 and integrally formed an outer frame 21, a plurality of inner frames 22 and a plurality of keycaps 23. The outer frame 21 has a plurality of holding zones 211 corresponding to the trigger portions 11 to hold the keycaps 23 which also correspond to the trigger portions 11.

Figure 2:
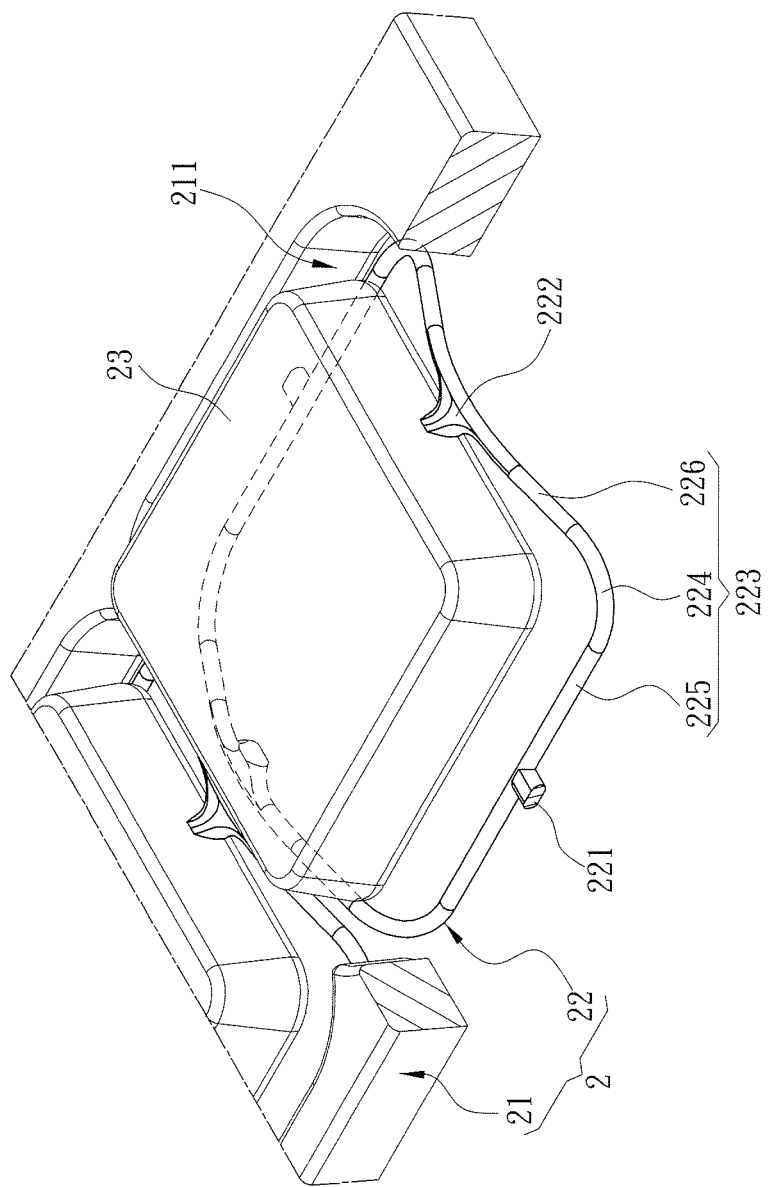
FIG. 2 is a fragmentary sectional view of the frame of the first embodiment of the invention.

Each inner frame 22 is corresponding to one keycap 23, and includes at least two first connecting portions 221 connected to the outer frame 21 and at least two second connecting portions 222 connected to the keycap 23. And each first connecting portion 221 and each second connecting portion 222 are bridged by a support portion 223 which can generate a deformation elastic force when the keycap is moved to the trigger portion. Furthermore, the support portion 223 has a bend spot 224. The support portion from the bend spot 224 to the first connecting portion 221 is defined as a first connecting section 225. The support portion from the bend spot 224 to the second connecting portion 222 is defined as a second connecting section 226. Moreover, the bend spot 224 can be located at a corner of the keycap 23. In one embodiment the second connecting portion 222 in the holding zone 211 is formed at an elevation higher than that of the first connecting portion 221, and the bend spot 224 is at an elevation equal to or lower than that of the first connecting portion 221, as shown in FIG. 2. In another embodiment the second connecting section 226 is a curved surface.

During implementation of the command trigger structure of the invention, the frame 2 is stacked over the circuit board 1, and each keycap 23 corresponds to one of the trigger portions 11 on the circuit board 1. When the keycap 23 is not being depressed the inner frame 22 supports the keycap 23 in the holding zone 211 through the first connecting section 225 and the second connecting section 226 so that the keycap 23 is not in contact with the trigger portion 11, and the keycap 23 and the circuit board 1 are interposed by a movement interval 3. When the keycap 23 is depressed under a force it is moved toward the trigger portion 11, and the inner frame 22 has the first connecting portion 221 functioned as a support spot and the second connecting portion 222 functioned as a force applying spot so that the first connecting section 225 and the second connecting section 226 generate a deformation, and the keycap 23 is moved toward the trigger portion 11 and triggers thereof to generate the keyboard command, as shown in FIGS. 6 and 7. When the force applied on the keycap 23 is absent the first connecting section 225 of each support portion 223 returns to its original condition before being depressed because of its own elastic force, and also drives the keycap 23 away from the trigger portion 11 in the condition before being depressed.

Figure 3:
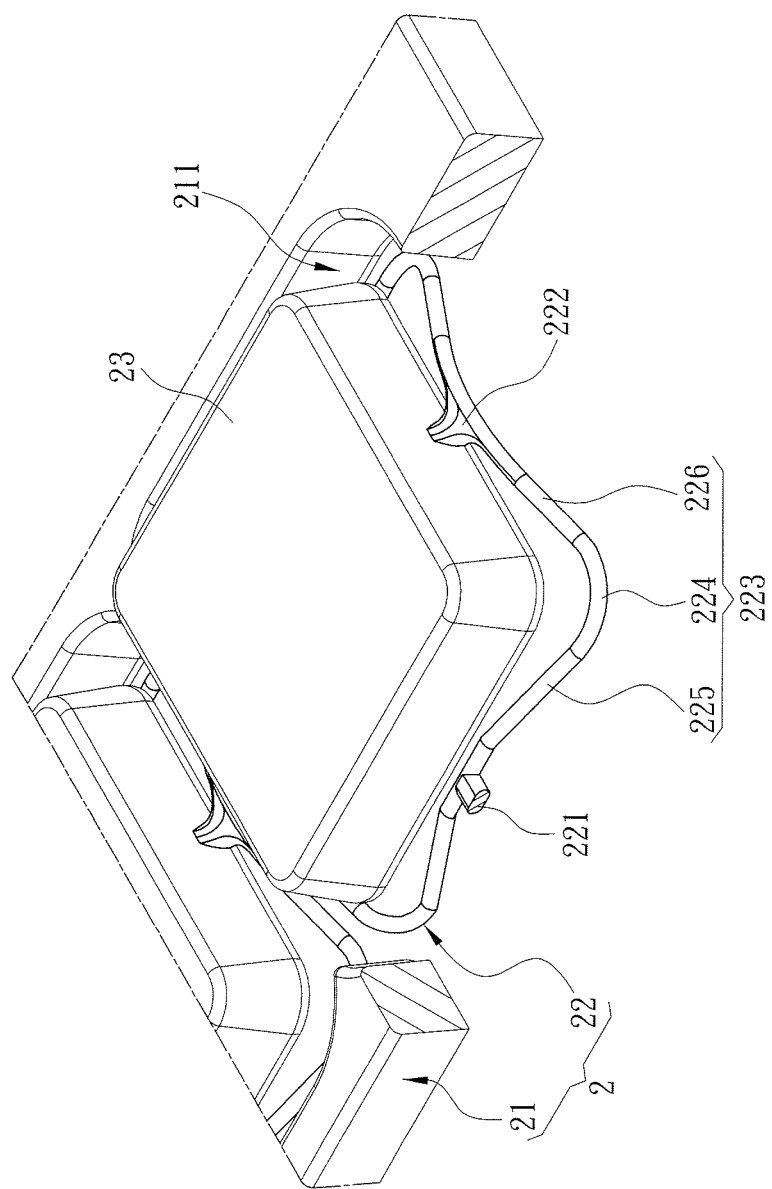
FIG. 3 is a fragmentary sectional view of the frame of a second embodiment of the invention.
Figure 4:
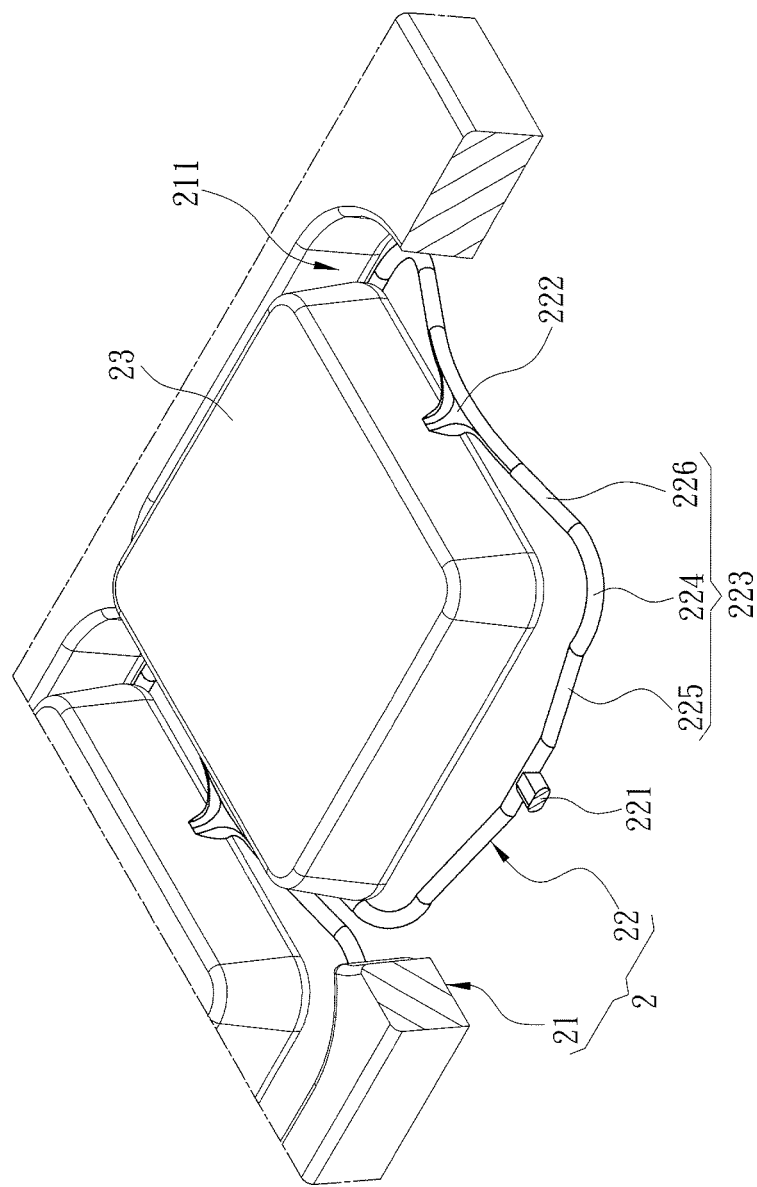
FIG. 4 is a fragmentary sectional view of the frame of a third embodiment of the invention.
Figure 5:
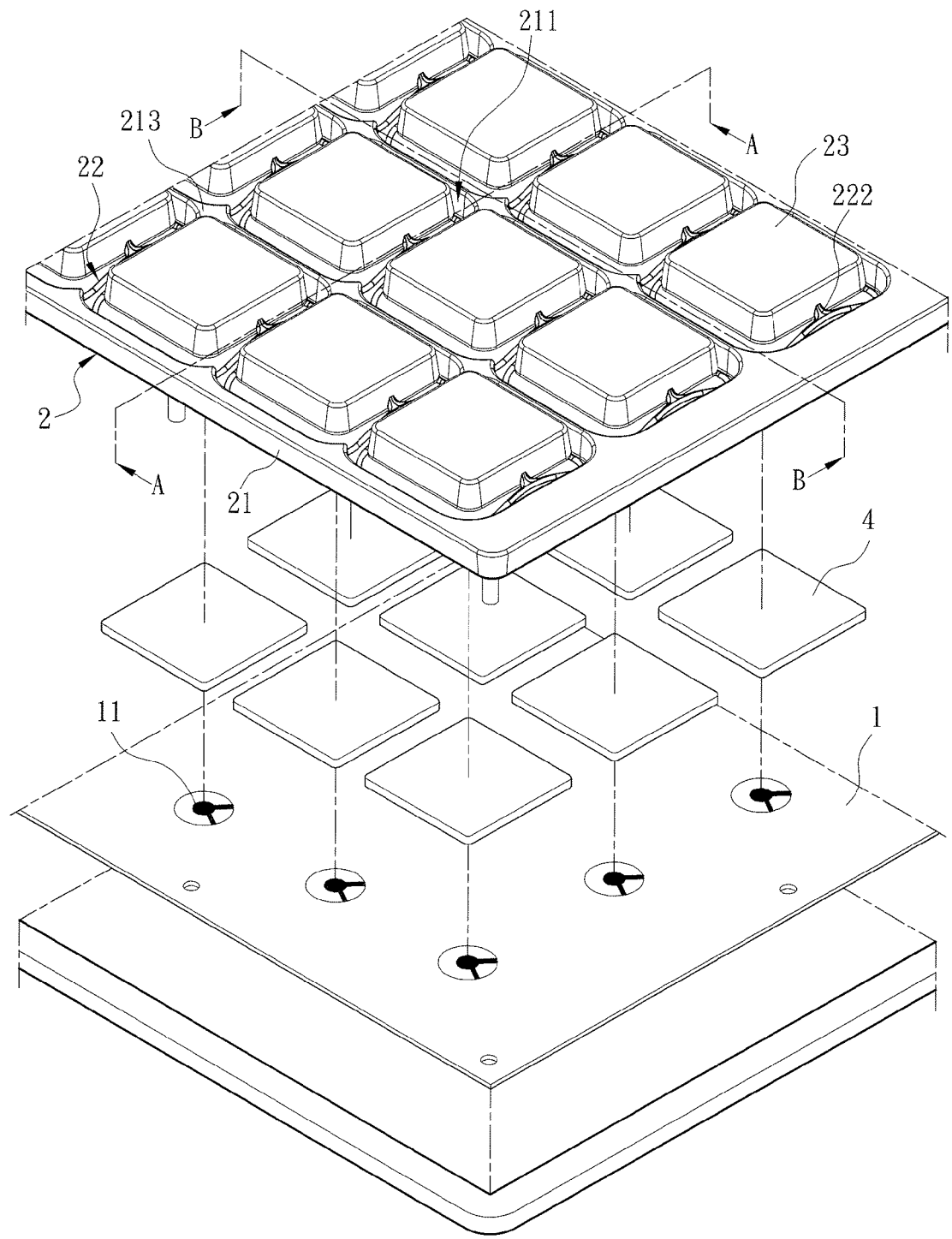
FIG. 5 is an exploded view of the thin keyboard structure of the first embodiment of the invention.

Please also referring to FIGS. 3 and 4, aside from the embodiment previously discussed, the inner frame 22 can also be changed to other styles to alter the tactile depressing feel of the command trigger structure. In another embodiment the second connecting portion 222 of the inner frame 22 is located in the holding zone 211 at an elevation equal to or higher than that of the first connecting portion 221, and the bend spot 224 is at an elevation lower than that of the first connecting portion 221 and the second connecting portion 222 as shown in FIG. 3. Furthermore, the inner frame 22 in the holding zone 211 has elevation variations in this order: the second connection portion 222 is equal to or higher than the bend spot 224 which in turn is higher than the first connecting portion 221 as shown in FIG. 4.

Figure 8:
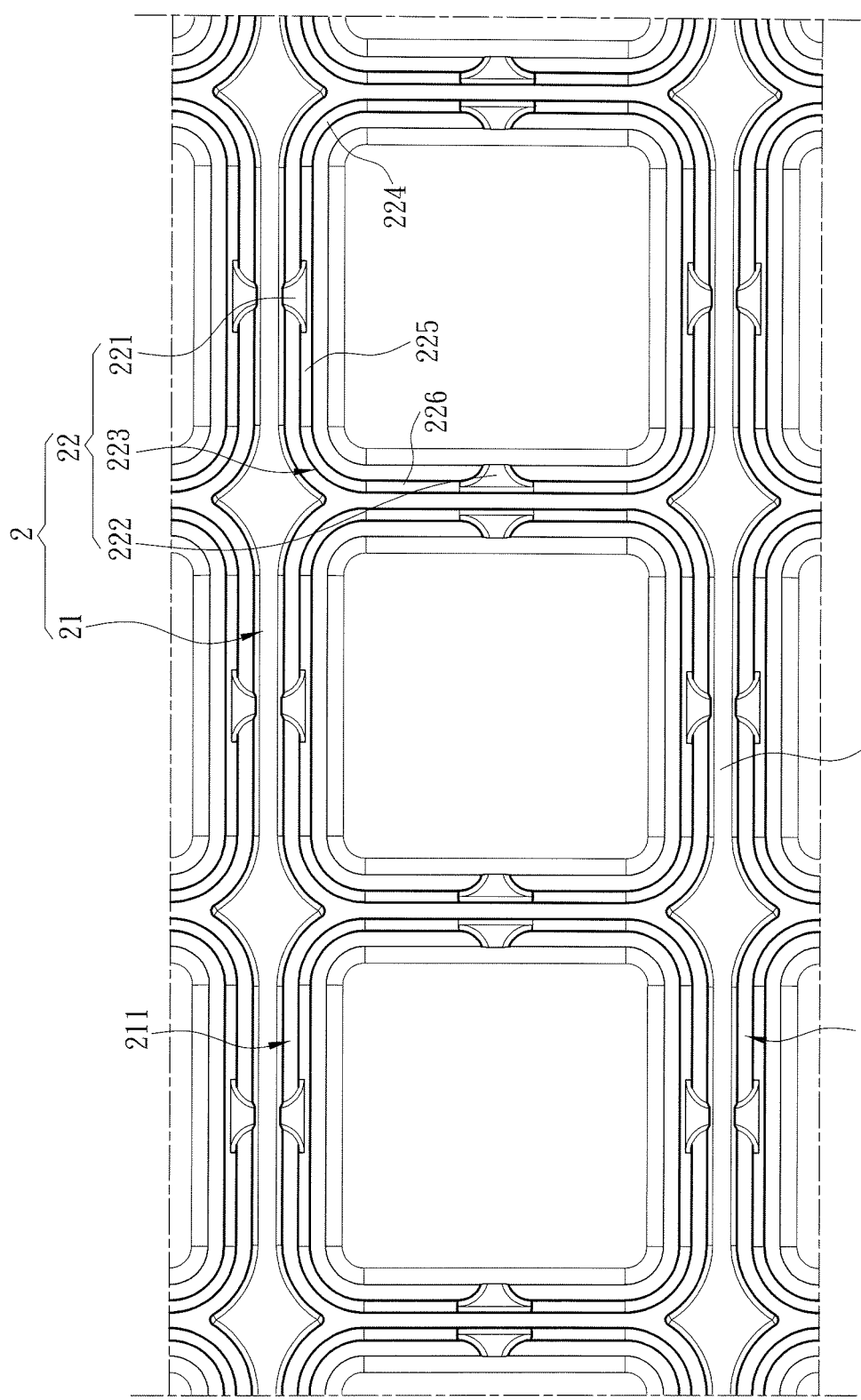
FIG. 8 is a top view of the frame of a fourth embodiment of the invention.

Also referring to FIG. 1, in another embodiment the holding zones 211 and 212 formed on the outer frame 21 can be adjusted according to design requirements. For instance, each of the holding zones 211 and 212 can be made corresponding to each trigger portion 11, or to hold a plurality of the trigger portions 11. Moreover, the holding zones 211 and 212 allow the keycaps 23 to be horizontally or vertically held therein. The outer frame 21 also has a support rib 213 interposed between two abutting holding zones 211 and 212. The support rib 213, aside from connecting to the first connecting portion 211 of the inner frame 22, also can confine movement range of each keycap 23 to prevent the keycap 23 from skewing caused by improper force applying of the users. Also referring to FIG. 8, in yet another embodiment the width of the first connecting portion 221 of the inner frame 22 increases gradually from the junction of the first connecting portion 221 and the outer frame 21 toward the support portion 223, and the width of the second connecting portion 222 shrinks gradually from the junction of the second connecting portion 222 and the support portion 223 toward the junction with the keycap 23, thereby increase total structural strength of the inner frame 22.

Figure 9:
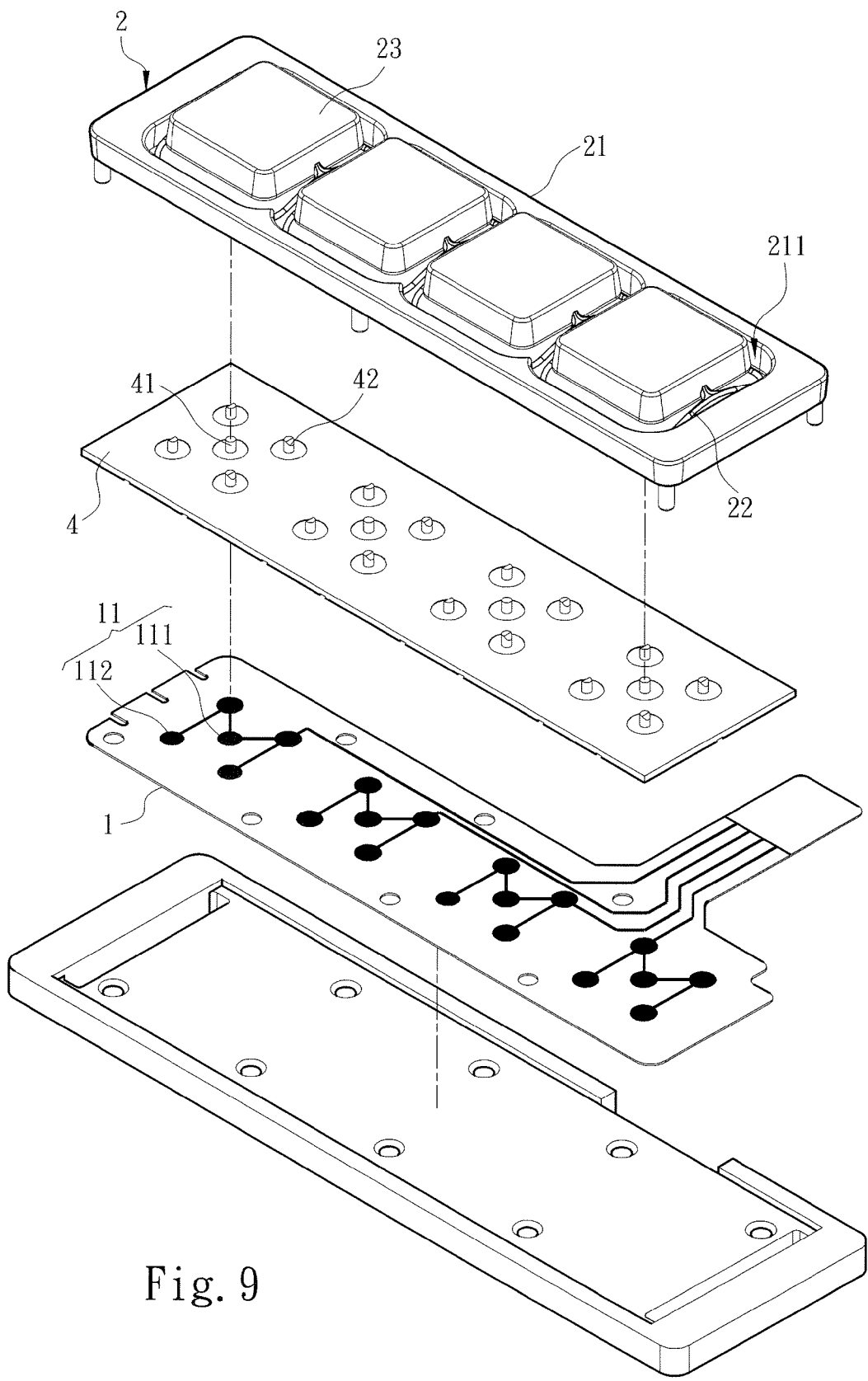
FIG. 9 is an exploded view of the thin keyboard structure of a fifth embodiment of the invention.

As previously discussed, the keycap 23 and the circuit board 1 are interposed by the movement interval 3 before the keycap 23 is depressed. In yet another embodiment an elastic support member 4 is provided on the circuit board 1 corresponding to the movement interval 3 to aid movement of the keycap 23 against the circuit board 1. The elastic support member 4 can be an elastic reed or an elastic sponge. Furthermore, the elastic support member 4 further has a contact portion 41 corresponding to each trigger portion 11. The contact portion 41 is not in contact with the trigger portion 11 in normal conditions. But when the elastic support member 4 is depressed by the corresponding keycap 23 and deforms, the contact portion 41 connects the trigger portion 11 to generate the keyboard command. Please referring to FIG. 9, in yet another embodiment each trigger portion 11 of the circuit board 1 includes a primary trigger switch 111 and a plurality of secondary trigger switches 112 that are electrically connected to each other. The elastic support member 4 corresponding to each trigger portion 11 has a plurality of contact portions 41 and 42 corresponding respectively to the primary trigger switch 111 and the secondary trigger switches 112. Furthermore, the contact portion 41 corresponding to the primary trigger switch 111 can be designed at a length longer than other contact portions 42 corresponding to the secondary trigger switches 112. Such a design can prevent trigger failure of the trigger portion 11 due to skewed movement of the keycap 23 caused by improper force applying of the users.

As a conclusion, the thin keyboard command trigger structure of the invention includes a circuit board and a frame. The frame is stacked over the circuit board and integrally formed an outer frame, a plurality of inner frames and a plurality of keycaps. The outer frame has a plurality of holding zones. Each keycap is located in one holding zone. The outer frame and the keycap are bridged by one inner frame. Each inner frame has at least two first connecting portions connected to the outer frame and at least two second connecting portions connected to the keycap, and each first connecting portion and each second connecting portion are bridged by a support portion which can generate deformation to support keycap movement. The support portion has a bend spot. The support portion at the second connecting portion is at an elevation higher than that of the first connecting portion, and the support portion at the bend spot is at an elevation equal to or lower than that of the first connecting portion. Thus, the keycap link movement member used in the conventional keyboard can be dispensed with, and the total thickness of the keyboard can be reduced to make the keyboard thinner without being constrained by the height of the keycap link movement member.

What is claimed is:

1. A thin keyboard command trigger structure, comprising:
a circuit board including a plurality of trigger portions each accepting contact to generate a keyboard command; and
a frame which is stacked over the circuit board and formed of an outer frame, a plurality of inner frames and a plurality of keycaps in an integrated manner, the outer frame including a plurality of holding zones corresponding to the trigger portions, each keycap being located in one holding zone corresponding to one trigger portion, the outer frame and each keycap being bridged by one of the plurality of inner frames, each inner frame including at least two first connecting portions connected to the outer frame and at least two second connecting portions connected to a respective keycap, each first connecting portion and each second connecting portion being bridged by a support portion which generates a deformation elastic force when one of the keycaps is moved to a respective trigger portion, each support portion including a bend spot and a first connecting section formed between the bend spot and the first connecting portion and a second connecting section formed between the bend spot and the second connecting portion;
wherein each second connecting portion located in the holding zone is at an elevation higher than that of a respective first connecting portion and each bend spot is at an elevation equal to or lower than that of a respective first connecting portion.

2. The thin keyboard command trigger structure of claim 1, wherein the keycaps are held horizontally or vertically in the holding zones, and the frame includes a support rib to bridge two abutting holding zones.

3. The thin keyboard command trigger structure of claim 1, wherein each first connecting portion is formed at a width gradually increased from the junction of the first connecting portion and the outer frame towards the support portion, and each second connecting portion is formed at a width gradually shrunk from the junction of the second connecting portion and the support portion towards the junction with the keycap.

4. The thin keyboard command trigger structure of claim 1, wherein each keycap and the circuit board are interposed by a movement interval which includes an elastic support member to aid movement of the keycap relative to the circuit board.

5. The thin keyboard command trigger structure of claim 4, wherein each trigger portion includes a primary trigger switch and a plurality of secondary trigger switches that are electrically connected to each other, and each elastic support member includes a plurality of contact portions corresponding respectively to the primary trigger switch and the secondary trigger switches.

6. The thin keyboard command trigger structure of claim 1, wherein the second connecting section is a curved surface.

7. A thin keyboard command trigger structure, comprising:
a circuit board including a plurality of trigger portions each accepting contact to generate a keyboard command; and
a frame which is stacked over the circuit board and formed of an outer frame, a plurality of inner frames and a plurality of keycaps in an integrated manner, the outer frame including a plurality of holding zones corresponding to the trigger portions, each keycap being located in one holding zone corresponding to one trigger portion, the outer frame and each keycap being bridged by one of the plurality of inner frames, each inner frame including at least two first connecting portions connected to the outer frame and at least two second connecting portions connected to a respective keycap, each first connecting portion and each second connecting portion being bridged by a support portion which generates a deformation elastic force when one of the keycaps is moved to a respective trigger portion, each support portion including a bend spot and a first connecting section formed between the bend spot and the first connecting portion and a second connecting section formed between the bend spot and the second connecting portion;
wherein each second connecting portion located in the holding zone is at an elevation equal to or higher than that of a respective first connecting portion, and each bend spot is at an elevation lower than that of a respective second connecting portion.

8. The thin keyboard command trigger structure of claim 7, wherein the keycaps are held horizontally or vertically in the holding zones, and the frame includes a support rib to bridge two abutting holding zones.

9. The thin keyboard command trigger structure of claim 7, wherein each first connecting portion is formed at a width gradually increased from the junction of the first connecting portion and the outer frame towards the support portion, and each second connecting portion is formed at a width gradually shrunk from the junction of the second connecting portion and the support portion towards the junction with the keycap.

10. The thin keyboard command trigger structure of claim 7, wherein each keycap and the circuit board are interposed by a movement interval which includes an elastic support member to aid movement of the keycap relative to the circuit board.

11. The thin keyboard command trigger structure of claim 10, wherein each trigger portion includes a primary trigger switch and a plurality of secondary trigger switches that are electrically connected to each other, and each elastic support member includes a plurality of contact portions corresponding respectively to the primary trigger switch and the secondary trigger switches.

12. The thin keyboard command trigger structure of claim 7, wherein the second connecting section is a curved surface.

13. A thin keyboard command trigger structure, comprising:
a circuit board including a plurality of trigger portions each accepting contact to generate a keyboard command; and
a frame which is stacked over the circuit board and formed of an outer frame, a plurality of inner frames and a plurality of keycaps in an integrated manner, the outer frame including a plurality of holding zones corresponding to the trigger portions, each keycap being located in one holding zone corresponding to one trigger portion, the outer frame and each keycap being bridged by one of the plurality of inner frames, each inner frame including at least two first connecting portions connected to the outer frame and at least two second connecting portions connected to a respective keycap, each first connecting portion and each second connecting portion being bridged by a support portion which generates a deformation elastic force when one of the keycaps is moved to a respective trigger portion, each support portion including a bend spot and a first connecting section formed between the bend spot and the first connecting portion and a second connecting section formed between the bend spot and the second connecting portion;
wherein each inner frame located in the holding zone has elevation variations such that the second connecting portion is equal to or higher than the bend spot which is higher than a respective first connecting portion.

14. The thin keyboard command trigger structure of claim 13, wherein the keycaps are held horizontally or vertically in the holding zones, and the frame includes a support rib to bridge two abutting holding zones.

15. The thin keyboard command trigger structure of claim 13, wherein each first connecting portion is formed at a width gradually increased from the junction of the first connecting portion and the outer frame towards the support portion, and each second connecting portion is formed at a width gradually shrunk from the junction of the second connecting portion and the support portion towards the junction with the keycap.

16. The thin keyboard command trigger structure of claim 13, wherein each keycap and the circuit board are interposed by a movement interval which includes an elastic support member to aid movement of the keycap relative to the circuit board.

17. The thin keyboard command trigger structure of claim 16, wherein each trigger portion includes a primary trigger switch and a plurality of secondary trigger switches that are electrically connected to each other, and each elastic support member includes a plurality of contact portions corresponding respectively to the primary trigger switch and the secondary trigger switches.

18. The thin keyboard command trigger structure of claim 13, wherein the second connecting section is a curved surface.

* * * * *